| United States Patent [19] | [11] Patent Number: 4,591,640 |
| Hjertén | [45] Date of Patent: May 27, 1986 |

[54] METHOD FOR CROSS-LINKING OF AGAR PRODUCTS

[76] Inventor: Stellan Hjertén, Långvägen 7 B, S-752 52 Upsala, Sweden

[21] Appl. No.: 693,106

[22] Filed: Jan. 22, 1985

[30] Foreign Application Priority Data

Jan. 23, 1984 [SE] Sweden .................. 8400305

[51] Int. Cl.$^4$ .............................................. C08B 37/12
[52] U.S. Cl. ................................................. 536/114
[58] Field of Search .......................................... 536/114

[56] References Cited

U.S. PATENT DOCUMENTS 3,959,251  5/1976  Porath et al. ................. 536/114

FOREIGN PATENT DOCUMENTS 403116  7/1978  Sweden .

OTHER PUBLICATIONS

Journal of Chromatography, 103 (1975), 49–62.

*Primary Examiner*—Ronald W. Griffin
*Attorney, Agent, or Firm*—Burns, Doane, Swecker & Mathis

[57] ABSTRACT

The invention relates to a method for cross-linking of agar products in an alkaline surrounding. According to the invention divinylsulfone is used as cross-linking agent in a manner known per se. The cross-linking is performed at room temperature at pH>11 in the presence of a reducing agent, and unreacted vinyl groups are deactivated by means of a neutral hydrophilic deactivating substance comprising several hydroxyl groups. The cross-linking was stable even at a pH as high as 13 during a test period of 15 days.

8 Claims, 3 Drawing Figures

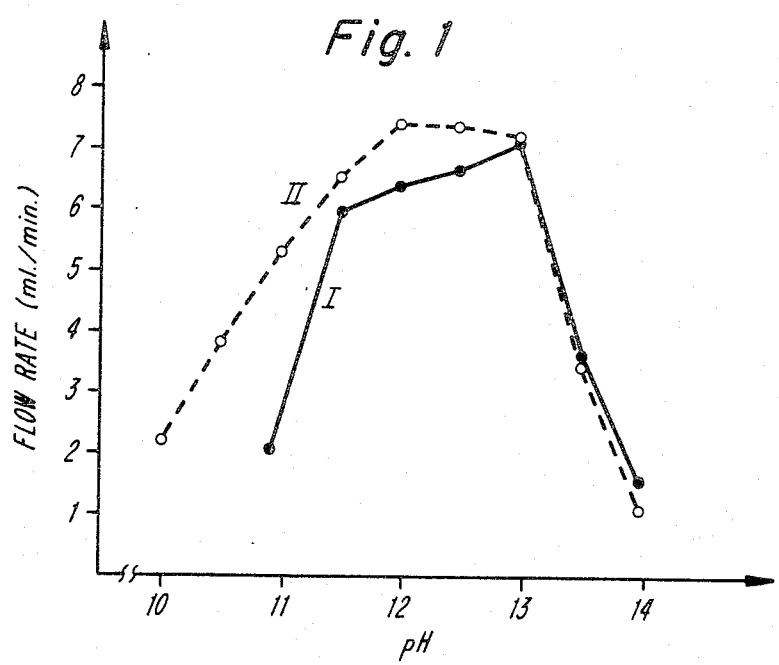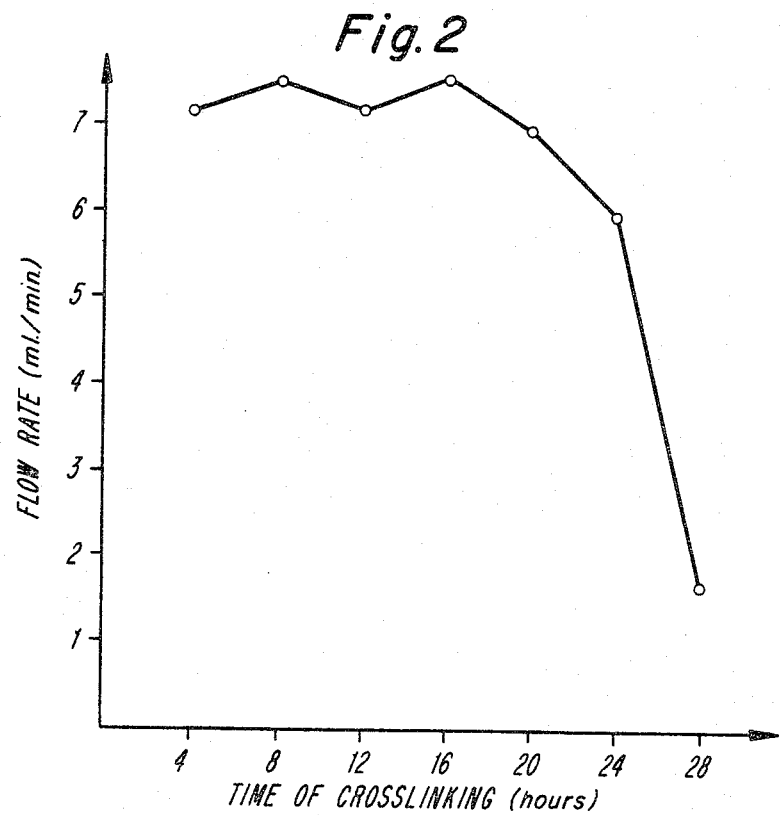

4,591,640

METHOD FOR CROSS-LINKING OF AGAR PRODUCTS

TECHNICAL FIELD

The invention relates to a method for cross-linking of agar products in an alkaline surrounding.

BACKGROUND ART

Agarose is the most universally utilized chromatographic gel matrix for the separation of biopolymers in such applications as gel filtration, ion exchange chromatography, affinity chromatography, dye ligand chromatography, and hydrophobic interaction chromatography. The wide applicability of agarose is based on its neutrality and hydrophilicity, the ease with which it can be derivatised and cross-linked and its porosity and pH-stability.

Until recently, agarose has been used exclusively for conventional low-pressure chromatography. However, it has been shown that agarose can be used also for High Performance Liquid Chromatography (HPLC) which makes the application range for agarose still wider.

A decisive requirement of a bed material for HPLC is that it can tolerate relatively high pressures without appreciable deformation. Some compressibility may, however, be desirable since the void volume then decreases more than the total volume, which leads to an increase in resolution.

Cross-linked agarose gels, which are still permeable to proteins and particles, fulfill this requirement.

Divinylsulfone (DVS) belongs to the group of cross-linking agents which permit high flow rates.

From J. Chromatogr. 103 (1975) 49–62 it is known to cross-link agarose gels with DVS but in practice it has been found that such gels exhibit the following drawbacks that limit their usefulness as chromatographic bed materials:

(1) Blue Dextran used as a void volume marker was irreversibly adsorbed.
(2) Some model proteins were more or less adsorbed (hemoglobin irreversibly).
(3) The reproducibility in the cross-linking experiments was not satisfactory, since the maximum flow rate obtainable varied from batch to batch and was sometimes relatively low.
(4) In the above article it was stated that the DVS-cross-linked gels were not stable above pH 9.

DISCLOSURE OF INVENTION

The object of the present invention is to bring about a method for cross-linking of agar products, e.g. agarose beads, with DVS to obtain a material which is suitable as bed material for chromatography, particularly HPLC, and which in this application enables higher flow rates than what has so far been possible.

This is attained by the method according to the invention in that divinylsulfone is used as cross-linking agent in a manner known per se, that the cross-linking is performed at pH>11 in the presence of a reducing agent and that unreacted vinyl groups are deactivated by means of a neutral hydrophilic deactivating substance comprising several hydroxyl groups.

BRIEF DESCRIPTION OF DRAWING

The invention will be described more in detail below with reference to the attached drawings on which:

FIG. 1 is a diagram showing the flow rate as a function of the pH at the onset of the cross-linking procedure in the presence of sodium borohydride, $NaBH_4$, FIG. 2 is a diagram showing the relationship between the flow rate and the time of the cross-linking reaction.

DETAILED DESCRIPTION

Figure 3:
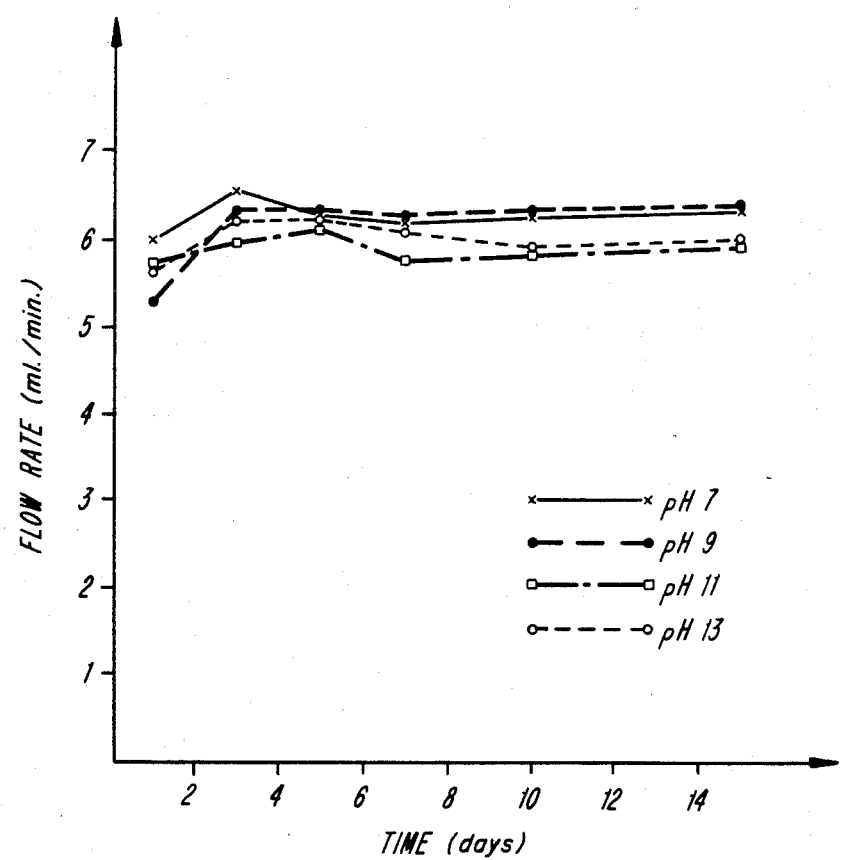
FIG. 3 is a diagram showing the pH stability of agarose beads cross-linked with DVS according to the invention.

Agarose was obtained from IBF, 92390 Villeneuve-La-Garenne, France; Blue Dextran from Pharmacia Fine Chemicals, Uppsala, Sweden; DVS from Fluka AG, Buchs SG, Switzerland and sodium borohydride from Merck-Schuchardt, 8011 Hohenbrunn bei München, Germany.

Agarose beads were prepared in a manner known per se according to a method described in Biochim. Biophys. Acta 79 (1964) 393–398.

The home-made column tubes having a diameter of 6 mm and a length of 300 mm, were of plexiglass and were equipped with a movable upper plunger for accomplishing agarose beds of different heights, the beds being supported by a 2 $\mu$m metal frit.

The HPLC pump was from Micromeritics, Georgia 30093, U.S.A.

Initially the cross-linking with DVS was performed in the manner described in the above article in J. Chromatogr. As already mentioned it was, however, found that gels cross-linked by that procedure strongly adsorbed Blue Dextran and some model proteins. To suppress the adsorption sodium borohydride was added to the reaction mixture in order to avoid oxidation and destruction of the agarose. No adsorption of Blue Dextran was then observed, but the maximum flow rate obtained was at the same time considerably lower than for gels cross-linked in the absence of sodium borohydride. (Sodium borohydride was not used in the method described in the above article in J. Chromatogr.).

This decrease in flow rate could possibly be due to saturation of one or both of the double bonds in some of the DVS molecules by the hydrogen liberated from the sodium borohydride.

The sodium borohydride was therefore replaced by a stream of nitrogen. However, the result was unsatisfactory, since the adsorption of Blue Dextran still was very strong.

The problem of suppressing adsorption without decreasing the flow rate was not solved until the flow rate was measured at a constant pressure as a function of the pH at which the cross-linking took place in the presence of sodium borohydride in accordance with FIG. 1.

When the curves in FIG. 1 were recorded the bed material was 12% agarose beads, 5–40 $\mu$m. The column had a diameter of 6 mm and a length of 120 mm. The pressure was 62 atm. The curve I was obtained when the cross-linking was performed in a solution of 0.5M sodium carbonate, while the curve II was obtained when the cross-linking was performed in water where pH was occasionally adjusted to the value indicated on the X-axis.

FIG. 1 shows that a small decrease in pH below 11 diminishes the flow rate considerably. When it was investigated whether the addition of sodium borohydride changed the pH of 0.5M $Na_2CO_3$ solution used as the reaction medium in accordance with the above article in J. Chromatogr., it was found that the pH dropped from 11.3 to 10.7 upon addition of sodium borohydride to a concentration of 2%. This decrease in pH was sufficient to give a lower degree of cross-linking and a lower flow rate (compare FIG. 1). During the cross-linking reaction the pH decreased further and in a non-reproducible way. In addition, upon storage for some weeks, the pH of the 0.5M $Na_2CO_3$ solution diminished from 11.0 to 10.6.

These observations explained why the flow rate decreased when the cross-linking was performed in the presence of sodium borohydride.

According to the invention the cross-linking is performed with sodium borohydride as reducing agent to suppress adsorption of Blue Dextran and hemoglobin, and at a pH>11 to increase the degree of cross-linking, i.e. the flow rate.

As apparent from FIG. 1 high and reproducible flow rates are obtained if the cross-linking is done in the pH interval 12.0–12.5.

Thus, according to the invention the cross-linking is performed under reducing conditions to prevent or minimize adsorption of Blue Dextran and proteins. Even if other reducing agents, e.g. hydrogen gas, can be used, sodium borohydride is preferably used, since it has long been used to prevent degradation of agarose at high pH. The risk of destruction of agarose is, of course, more pronounced at higher temperatures. Therefore, the entire cross-linking procedure according to the invention is conducted at room temperature, which gives a perfectly white product (in the method described in the above article in J. Chromatogr. part of the reaction was performed at 45° C.).

FIG. 2 shows that the flow rate is independent of the time used for the cross-linking reaction in the interval 4–20 h. The cross-linking according to FIG. 2 was performed in 0.5M sodium carbonate at an initial pH of 12.5.

According to the invention neutral and hydrophilic substances containing several hydroxyl groups, are used for deactivation of unreacted vinyl groups in DVS. The deactivating substance can, according to the invention, be made up of low-molecular components as well as polymers. As examples of deactivating substances galactose, mannitol, glucose, dextran, amylose, guaran or the like can be mentioned.

These substances have the following advantages:

(1) They do not increase the charge or hydrophobicity of the matrix, which reduces the risk for adsorption of proteins. Glycine and mercaptoethanol recommended as deactivating substances in said J. Chromatogr. 103 (1975) 49–62, can cause adsorption of proteins, since glycine makes the matrix more charged and mercaptoethanol renders it more hydrophobic.

(2) They can form a cross-linking bridge between non-reacted vinyl groups and, thus, increase the rigidity of the agarose gel, i.e. the flow rate. Since the distances between these vinyl groups in the agarose are different the probability is high for a substance comprising many hydroxyl groups at different distances from each other to give rise to a cross-link. From this point of view mannitol might be preferable to galactose.

(3) Their OH groups can be used for attachment of different ligands to agarose. This means that the reduction in available OH groups in the agarose chains caused by the cross-linking procedure is counteracted or even overcompensated by the OH groups in galactose and mannitol.

Since the DVS treatment of agarose was reported in the above article in J. Chromatogr. to give a product which was not stable at pH>9, it was investigated whether the cross-linked agarose prepared according to the invention, had the same weakness.

The experiment, performed at room temperature in 0.05M solutions of sodium phosphate of pH 7.0, 9.0, 11.0, and 13.0, gave the result shown in FIG. 3. From FIG. 3 it is apparent that the cross-linking was stable even at pH 13 during the whole test period of 15 days. The stability of the gel is thus excellent. A separate experiment indicated that the cross-linking was not even affected by treatment with 1M NaOH for 15 h.

EXAMPLE

About 10 g of sedimented 12% agarose beads, prepared as described in the above article in Biochim. Biophys. Acta 79 (1964) 393–398, are suspended in an Erlenmayer flask in 12 ml of 0.5M $K_2HPO_4$ adjusted to pH 12.0–12.5 with 4M KOH. (One can also perform the experiment in water if the pH is maintained at pH 12.0–12.5 by occasional addition of 4M KOH.) About 0.06 g of $NaBH_4$ is added with stirring followed by 0.6 ml of DVS. The stirring is continued for 20 h at room temperature. The agarose suspension is then centrifuged at 500× g for 10 min. The supernatant is removed and the gel is resuspended in about 12 ml of water of pH 11.5–12 adjusted with 4M KOH containing 0.06 g of $NaBH_4$. (Much larger amounts of $NaBH_4$ seem to cause a reduction in the flow rate.) After stirring the suspension is centrifuged again. The supernatant is removed. After three additional washings most of the excess of DVS has been removed. For deactivation of unreacted vinyl groups D-mannitol, 2 g, and $NaBH_4$, 50 mg, are added to the beads suspended in 20 ml of water adjusted to pH 12 with 4M KOH. After stirring for 6 h the gel beads are washed five times or to neutrality with water by centrifugation. The beads are then subjected to elutriation in distilled water or sieved to attain a more uniform size distribution. The packing of the column is also performed in distilled water.

I claim:

1. Method for cross-linking of agar products in an alkaline surrounding, characterized in that divinylsulfone is used as cross-linking agent in a manner known per se, that the cross-linking is performed at pH>11 in the presence of a reducing agent, and that unreacted vinyl groups are deactivated by means of a neutral hydrophilic deactivating substance comprising several hydroxyl groups.

2. Method according to claim 1, characterized in that the cross-linking is performed at a pH between 11.5 and 13.5.

3. Method according to claim 2, characterized in that the cross-linking is performed at a pH between 12.0 and 12.5.

4. Method according to claim 1, characterized in that the cross-linking is performed at room temperature.

5. Method according to claim 1, characterized in that the reducing agent comprises either sodium borohydride or hydrogen gas.

6. Method according to claim 1, characterized in that the deactivating substance is made up of low-molecular components as well as polymers.

7. Method according to claim 6, characterized in that the deactivating substance comprises galactose, mannitol, glucose, dextran, amylose, or guaran.

8. Method according to claim 1, characterized in that the neutral hydrophilic deactivating substance comprises at least five hydroxyl groups.

* * * * *